United States Patent Office 3,408,354
Patented Oct. 29, 1968

3,408,354
CATALYTIC HYDROGENATION OF 3- AND
4-HYDROXY PYRIDINES
Paul N. Rylander, Newark, and Nathan Himelstein, Hillside, N.J., assignors to Engelhard Industries, Inc., Newark, N.J., a corporation of Delaware
No Drawing. Filed Oct. 4, 1965, Ser. No. 492,843
7 Claims. (Cl. 260—293.2)

ABSTRACT OF THE DISCLOSURE

Hydroxypiperidines are prepared by catalytic hydrogenation of hydroxypyridines in admixture with a stoichiometric excess of an anhydride of a lower saturated aliphatic monocarboxylic acid, followed by hydrolysis of the hydrogenation product.

---

This invention relates to the hydrogenation of hydroxypyridines and, more particularly, to a process for the catalytic hydrogenation of hydroxypyridines in particular solvents to produce hydroxypiperidines.

Heretofore, hydroxypyridines have been hydrogenated only with great difficulty. For instance, catalytic hydrogenation over a platinum group metal catalyst in acetic acid, water, dilute sodium hydroxide, or in organic solvents such as ethyl acetate or methanol, fail to give hydrogenation at low pressures, and hydrogenation, if effected at all, requires long periods of time, for example from 12 to 24 hours.

In accordance with the present invention, hydroxypyridines are rapidly hydrogenated in the presence of particular platinum group metal catalysts by hydrogenating the hydroxypyridines in solution in a solvent comprising an anhydride of a saturated aliphatic monocarboxylic acid having from 2 to 6 carbon atoms in the molecule, and subsequently hydrolyzing the hydrogenated product to produce the corresponding hydroxypiperidine.

The hydroxypyridines which are hydrogenated according to the present invention include substituted or unsubstituted 3-hydroxypyridines and 4-hydroxypyridines having the structural formula

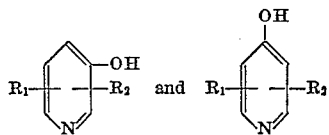

wherein $R_1$ and $R_2$ are each a hydrogen atom or a lower alkyl radical having from 1 to 6 carbon atoms.

While we do not wish to be bound by any theoretical explanation, it is known that 4-hydroxypyridine exists in keto-enol tautomeric forms, i.e.

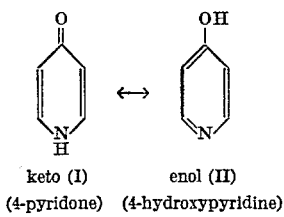

keto (I)     enol (II)
(4-pyridone)    (4-hydroxypyridine)

and it appears that upon adding the hydroxypyridine to a lower carboxylic acid anhydride such as acetic anhydride, the enol form is stabilized by conversion to the ester (III)

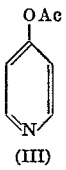

(III)

which is the effective moiety in the hydrogenation. It is also possible that some N-acylation occurs. Upon catalytic hydrogenation, the enol-ester III is converted to the corresponding hydroxypiperidine ester which, upon hydrolysis, yields 4-hydroxypiperidine.

The carboxylic acid anhydrides utilized in practicing the present invention are those of general formula $(R)_2O$, wherein R is lower alkanoyl having from 2–6 carbon atoms, e.g. acetic anhydride, butyric anhydride, valeric anhydride, caproic anhydride and mixtures thereof. Acetic anhydride is preferred because of low cost and availability.

The acid anhydride is admixed with the hydroxypyridine prior to hydrogenation in stoichiometric excess, for example, in a weight ratio of about 3:1 to 100:1, of the anhydride to hydroxypyridine. The admixing may be effected at room temperature, or at elevated temperature, e.g. up to about 100° C.

The hydrogenation is effected in the presence of platinum or palladium and/or their oxides as catalyst, which may be supported or unsupported, preferably the former. Suitable solid catalyst carriers are, for instance, carbon, barium sulfate, calcium carbonate, alumina, kieselguhr and silica. The catalyst may be in the form of granules, powder, extrudates, spheres and the like. The platinum or palladium catalyst may be present in amount, by weight, of about 0.1%–10%, based on weight of hydroxypyridine.

The hydrogenation can be carried out with good results at room temperature and atmospheric pressure. However, the temperature may range from about 25° C. to about 200° C., and the pressure from atmospheric pressure to 1000 p.s.i.g.

When hydrogenation is complete, the desired hydroxypiperidine is recovered from the reaction mixture by, for instance, filtration of the catalyst and removal of excess diluent if desired by vacuum distillation, followed by alkaline hydrolysis to convert the hydrogenation product to the hydroxypiperidine. The product can then be upgraded in purity by recrystallization from conventional solvents.

The invention is further illustrated by reference to the following Examples. Parts and percentages are by weight unless otherwise specified. Identification of the product was by infrared spectroscopy.

Example I 4-hydroxypyridine in amount of 1 part was admixed in a reactor at room temperature with 50 parts by weight of acetic anhydride. A particulate platinum group metal or oxide thereof, which was unsupported in one test run and supported in other test runs was added to the liquid reaction mixture as catalyst in separate test runs. Hydrogen gas was passed into the liquid reaction mixture containing the catalyst at a temperature of 25° C. and at atmospheric pressure in each test run. The hydrogenation was carried out over a period of 60 minutes for each test run. The results are set forth in Table I which follows:

TABLE I

| Test Run | Catalyst | Mg. Catalyst | Hydrogenation Rate in ml. H₂/min. |
|---|---|---|---|
| 1 | PtO₂ | 500 | 26 |
| 2 | 5% Rh/C | 1,000 | 0 |
| 3 | 5% Pd/C | 1,000 | 20 |
| 4 | 5% Pt/C | 1,000 | 5 |
| 5 | 5% Ru/C | 1,000 | 0 |

The data of Table I show that only the $PtO_2$ and supported Pd and Pt of Test Runs 1, 3 and 4 respectively resulted in hydrogenation of the 4-hydroxypyridine and that the hydrogenation rate with platinum oxide was especially rapid. Alkaline hydrolysis of the resulting piperidinyl acetate with aqueous caustic solution yielded 4-hydroxypiperidine.

When a supported Pt, Pd, Rh or Ru catalyst was utilized as catalyst and with either water, aqueous sodium hydroxide solution of 2% sodium hydroxide concentration, aqueous hydrochloric acid solution of 10% acid concentration, ethyl acetate or methanol as diluent or solvent under the conditions of Example I, no detectable hydrogenation of 4-hydroxypyridine occurred.

Example II

Ten (10) parts of 3-hydroxypyridine are admixed in a reactor at room temperature with 100 parts of acetic anhydride and 500 mg. $PtO_2$ powder added to the resultant solution. This mixture is shaken under hydrogen pressure of one atmosphere at 35–40° C. until absorption of hydrogen ceased. The catalyst is then separated by filtration and excess acetic anhydride removed from the mixture by vacuum distillation. Hydrolysis of the residue with aqueous sodium hydroxide solution yields 3-hydroxypiperidine.

The hydroxypiperidines produced by the process of this invention have utility as intermediates in the manufacture of pharmaceuticals.

What is claimed is:

1. A process for producing hydroxypiperidines which process comprises hydrogenating an admixture of a hydroxypyridine from the group consisting of those of the formula

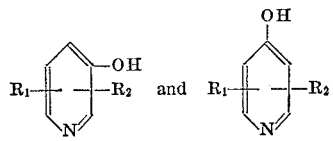

wherein $R_1$ and $R_2$ are from the group consisting of hydrogen and lower alkyl and a stoichiometric excess of an anhydride of a saturated aliphatic monocarboxylic acid having from 2 to 6 carbon atoms in the molecule, said admixture containing a weight ratio of from 3:1 to 100:1 of the anhydride to the hydroxypyridine, with molecular hydrogen at a temperature in the range of about 25° C. to about 200° C. and at a pressure from atmospheric to 1000 p.s.i.g. in the presence of a hydrogenation catalyst selected from the group consisting of platinum, palladium and oxides thereof, separating the catalyst and hydrolyzing the resultant reaction product to produce the corresponding hydroxypiperidine.

2. The process of claim 1 wherein the acid anhydride is acetic anhydride.

3. The process of claim 1 wherein the hydrogenation catalyst is $PtO_2$.

4. The process of claim 1 wherein the hydrogenation catalyst is supported on a solid catalyst carrier.

5. The process of claim 1 wherein the hydroxypyridine is 4-hydroxypyridine.

6. The process of claim 1 wherein the hydroxypyridine is 3-hydroxypyridine.

7. The process of claim 1 wherein the hydrogenation catalyst is palladium.

References Cited

UNITED STATES PATENTS

| 2,675,390 | 4/1954 | Rosenblatt | 260—293.2 |
| 2,802,007 | 8/1957 | Biel | 260—293.2 |
| 2,878,254 | 3/1959 | Shapiro et al. | 260—293.2 |
| 3,287,460 | 11/1966 | Thiel et al. | 260—293.2 |

HENRY R. JILES, *Primary Examiner.*

E. LEWIS, *Assistant Examiner.*